United States Patent
Bird

(10) Patent No.: US 11,118,560 B2
(45) Date of Patent: Sep. 14, 2021

(54) ELECTRICAL ENERGY GENERATING SYSTEMS, APPARATUSES, AND METHODS

(71) Applicant: Gregory Francis Bird, Milwaukee, WI (US)

(72) Inventor: Gregory Francis Bird, Milwaukee, WI (US)

(*) Notice: Subject to any disclaimer, the term of this patent is extended or adjusted under 35 U.S.C. 154(b) by 0 days.

(21) Appl. No.: 16/748,302

(22) Filed: Jan. 21, 2020

(65) Prior Publication Data

US 2020/0232442 A1  Jul. 23, 2020

Related U.S. Application Data

(60) Provisional application No. 62/795,243, filed on Jan. 22, 2019.

(51) Int. Cl.
| | |
|---|---|
| *F03B 13/00* | (2006.01) |
| *H02P 9/04* | (2006.01) |
| *F03B 17/06* | (2006.01) |
| *F03B 13/10* | (2006.01) |

(52) U.S. Cl.
CPC ............ *F03B 17/061* (2013.01); *F03B 13/10* (2013.01); *F05B 2240/917* (2013.01); *F05B 2240/95* (2013.01)

(58) Field of Classification Search
CPC ...... F03B 13/083; F03B 13/10; F03B 17/061; F05B 2240/33; F05B 2240/917; F05B 2240/95
See application file for complete search history.

(56) References Cited

U.S. PATENT DOCUMENTS

| 868,798 | A | | 10/1907 | McLaughlin | |
|---|---|---|---|---|---|
| 2,501,696 | A | | 3/1950 | Souczek | |
| 4,306,157 | A | * | 12/1981 | Wracsaricht | F03B 17/061 290/54 |
| 4,849,647 | A | * | 7/1989 | McKenzie | F03B 17/061 290/54 |
| 7,215,036 | B1 | * | 5/2007 | Gehring | F03B 17/061 290/54 |
| 7,235,893 | B2 | | 6/2007 | Platt | |
| 7,441,988 | B2 | * | 10/2008 | Manchester | F03B 13/10 405/75 |

(Continued)

OTHER PUBLICATIONS https://www.rechargenews.com/transition/landmark-in-stream-tidal-power-pilot-off-japan-in-water-later-this-year/2-1-749299 viewed Feb. 4, 2020.

(Continued)

*Primary Examiner* — Tulsidas C Patel
*Assistant Examiner* — Thomas K Quigley
(74) *Attorney, Agent, or Firm* — Andrus Intellectual Property Law, LLP

(57) ABSTRACT

An energy generating system for generating electrical energy from flow of a fluid includes an energy generating assembly having an outer shell defining an interior space and a center axis, a fixed generator coil stator extending in the interior space along the center axis, and a rotor encircling the stator and having magnets. The rotor is coupled to the outer shell, and the outer shell is configured to be rotated by the flow of the fluid such that the rotor rotates relative to the stator and thereby generates electrical energy. The system can include extending systems for positioning the assembly nearer or farther from shore in desired fluid flows.

18 Claims, 7 Drawing Sheets

(56) References Cited

U.S. PATENT DOCUMENTS

| | | | | |
|---|---|---|---|---|
| 7,487,637 | B2* | 2/2009 | Buttler | F03B 17/061 290/42 |
| 7,489,046 | B2* | 2/2009 | Costin | F03B 17/061 290/43 |
| 7,582,981 | B1* | 9/2009 | Meller | F03D 1/025 290/44 |
| 8,102,068 | B1* | 1/2012 | Gutekunst | F03B 17/063 290/53 |
| 8,219,257 | B2* | 7/2012 | Hunt | B63B 21/50 700/288 |
| 8,421,254 | B2* | 4/2013 | Desmeules | F03B 17/061 290/43 |
| 8,436,483 | B2* | 5/2013 | Perner | F03D 15/20 290/44 |
| 8,575,775 | B1* | 11/2013 | Gonzalez-Carlo | F03B 17/062 290/54 |
| 8,692,404 | B2* | 4/2014 | Chauvin | F03B 17/063 290/54 |
| 8,736,096 | B2* | 5/2014 | Kiyose | F03B 13/10 290/54 |
| 9,041,235 | B1* | 5/2015 | Hunter | F03B 13/00 290/54 |
| 9,777,699 | B1* | 10/2017 | Decady | F03B 13/08 |
| 9,784,236 | B2* | 10/2017 | Masek | F03B 3/04 |
| 10,107,254 | B2* | 10/2018 | Hofmann | F03B 13/26 |
| 2008/0191486 | A1* | 8/2008 | Sugano | F03B 17/061 290/54 |
| 2008/0203729 | A1* | 8/2008 | Zajchowski | F03B 17/063 290/43 |
| 2010/0148512 | A1* | 6/2010 | Pitre | F03B 13/10 290/54 |
| 2010/0332041 | A1* | 12/2010 | Hunt | B63B 21/50 700/287 |
| 2011/0089695 | A1* | 4/2011 | Krouse | F01D 15/10 290/52 |
| 2011/0285136 | A1* | 11/2011 | Desmeules | F03B 17/061 290/54 |
| 2012/0119510 | A1* | 5/2012 | Herzen | F03D 9/28 290/1 C |
| 2014/0219800 | A1* | 8/2014 | Lee | F03B 17/06 416/86 |
| 2015/0295481 | A1* | 10/2015 | Harris | H02K 16/005 290/43 |
| 2015/0330358 | A1* | 11/2015 | Barrero Gil | F03D 5/06 290/54 |
| 2016/0201647 | A1* | 7/2016 | Dysarsz | C25B 1/04 320/137 |
| 2017/0089319 | A1* | 3/2017 | Hofmann | F03B 17/061 |

OTHER PUBLICATIONS https://ece.nmsu.edu/research/hyper/ Hydropower Energy Resource Harvester Installation viewed Feb. 2, 2020.
https://simecatlantis.com/projects/meygen/ Tidal Stream Projects viewed Feb. 4, 2020 viewed Feb. 6, 2020.
https://ieeexplore.ieee.org/document/1508997 A Novel Hydropower Harvesting Device viewed Feb. 6, 2020.
https://www.ge.com/reports/go-with-the-flow-these-engineers-are-building-a-fish-friendly-hydropower-plant/ Go with the Flow: These Engineers are bilding a Fish-Friendly Hydropower Plant—GE Reports viewed Feb. 7, 2020.
https://www.mocean.energy/wave-energy-converter/ Wave energy Converter, Mocean pioneering wave technology viewed Feb. 12, 2020.
https://www.asme.org/topics-resources/content/fish-safe-turbines-empower-small-dam-hydro-projects?utm_campaign=Newsletter&utm_source=hs_email&utm_medium=email&utm_content=82683485&_hsenc=p2ANqtz--i4gGQoTQ-hNGNbe7aUrdetNkl_JrtZYiceL0TOk8-sz8soGSp26SR7T-xwKcC9E3pGEO35IEVW9F-bz4Da7kXv8B7_g Fish-Safe Turbines Empower Small-Dam Hydro Projects—ASME viewed Mar. 28, 2020.
https://www.waveswell.com/ Sustainable Electricity From the Ocean viewed Apr. 12, 2020.
https://orbitalmarine.com/technology-development/catching-the-tide/orbital-o2 Orbital Marine Power | World's Most Powerful Tidal Turbine viewed Apr. 15, 2020.
International Search Report and Written Opinion dated Apr. 9, 2020 in corresponding PCT Patent Application PCT/US20/14601.
https://www.energy.gov/eere/water/wave-energy-prize-teams viewed Apr. 5, 2021.
Drye, Willie, "Turning River Current Into Electricity", National Geographic, published Mar. 22, 2010, retrieved from https://www.nationalgeographic.com/science/article/river-current-electricity on Feb. 19, 2021.
"How Hydrokinetic Energy Works", Union of Concerned Scientists, published Jul. 14, 2007, updated Apr. 28, 2008, retrieved from https://www.ucsusa.org/resources/how-hydrokinetic-energy-works on Feb. 19, 2021.
Morbiato, Tommaso, "Design Concepts of Hydrokinetic Turbines, with an Emphasis on Performance in Variable Flows", SAARC Energy Seminar, Submersible Turbines in Canals and Assessment of Resource Potential, presented Feb. 8-9, 2018, retrieved from https://www.saarcenergy.org/wp-content/uploads/2018/02/Design-concepts-of-Hydrokinetic-Turbines-Performance-in-variable-flows-by-Tommaso-Morbiato..pdf on Feb. 19, 2021.
Givetash, Linda, "Tidal Energy Pioneers See Vast Potential in Ocean Currents' Ebb and Flow", NBC News, MACH, published Mar. 25, 2019, retrieved from https://www.nbcnews.com/mach/science/tidal-energy-pioneers-see-vast-potential-ocean-currents-ebb-flow-ncna981341 on Feb. 19, 2021.
"Energy Kite Promises a New Way to Harness Wind Power", NBC News, MACH, uploaded Jan. 28, 2019, retrieved from https://www.nbcnews.com/mach/video/energy-kite-promises-a-new-way-to-harness-wind-power-1433286723625 on Feb. 19, 2021.
Sullivant, Rosemary, "Turning the Tide to Energy: New Concept Could Harness the Power of Ocean Waves", NASA, published Mar. 5, 2009, retrieved from https://www.nasa.gov/topics/earth/features/tideenergy.html on Feb. 19, 2021.
"Wave Energy Prize Teams", Office of Energy Efficiency & Renewable Energy, updated Nov. 16, 2016, retrieved from https://www.energy.gov/eere/water/wave-energy-prize-teams on Feb. 19, 2021.
https://finance.yahoo.com/news/learning-past-three-generations-wave-123501472.html viewed Nov. 9, 2020.

* cited by examiner

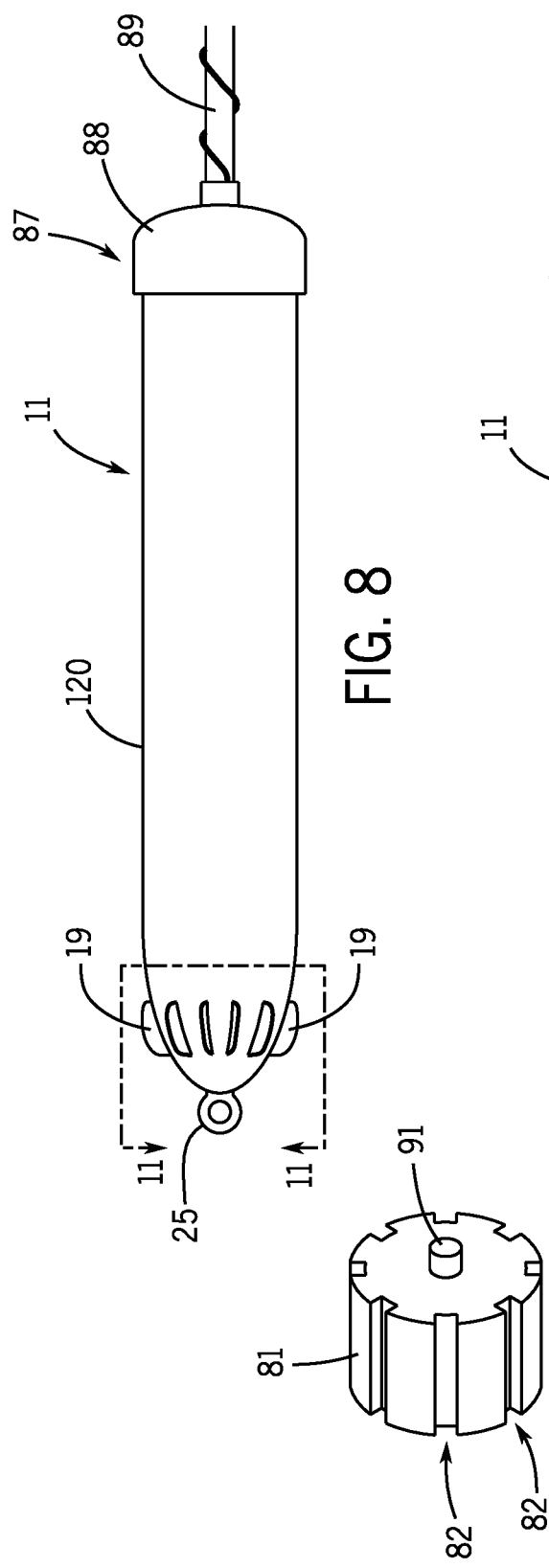
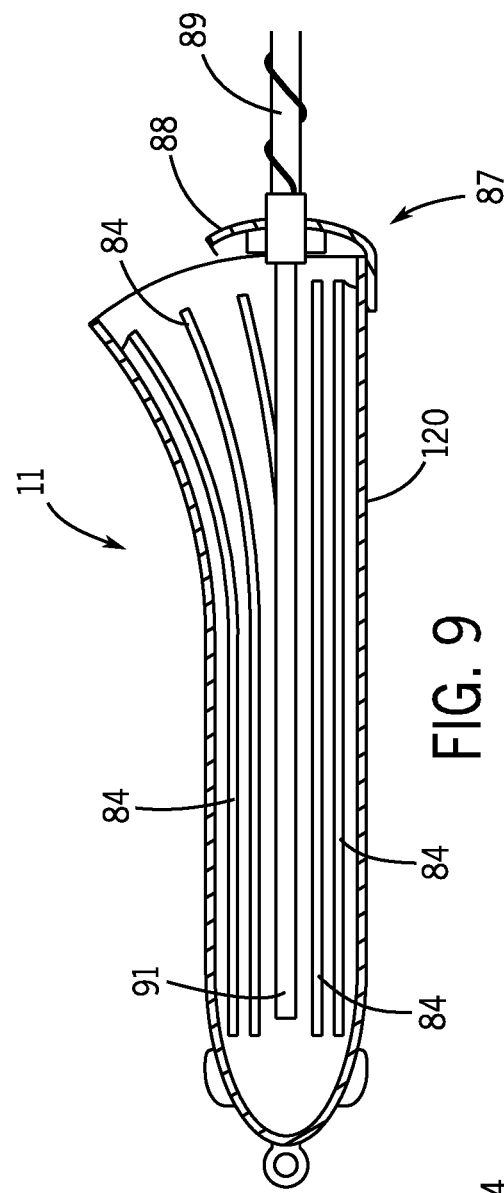
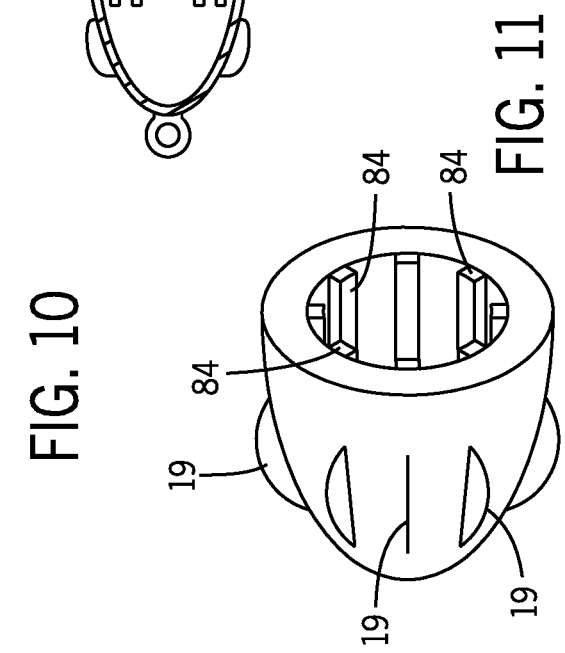

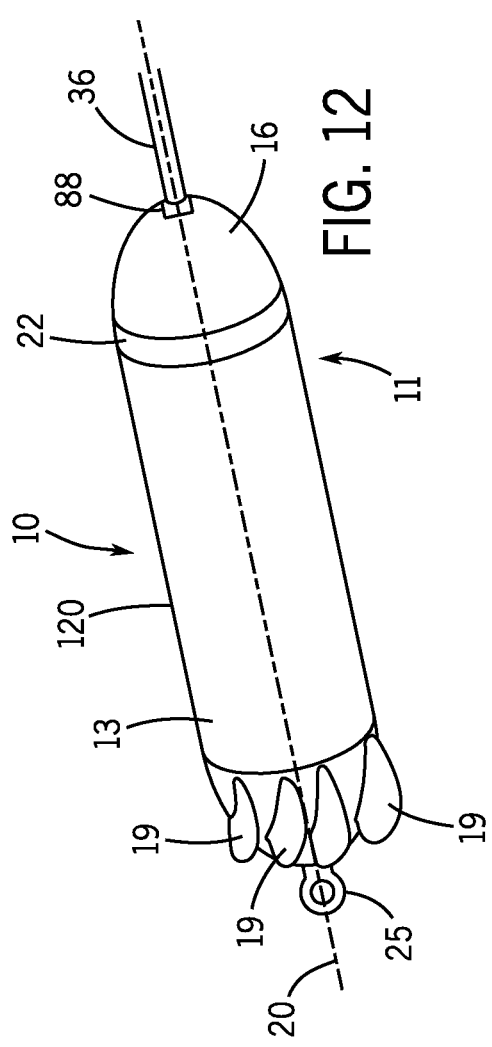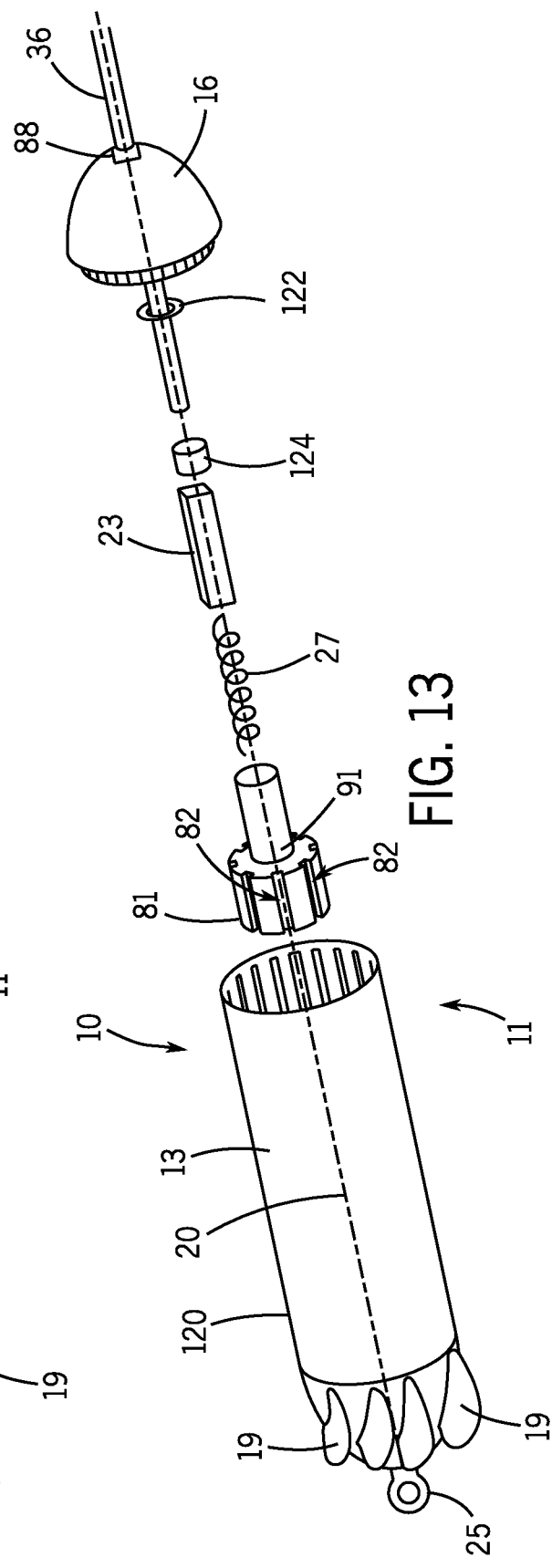

ELECTRICAL ENERGY GENERATING SYSTEMS, APPARATUSES, AND METHODS

CROSS-REFERENCE TO RELATED APPLICATION

The present disclosure is based on and claims priority to U.S. Provisional Patent Application No. 62/795,243 filed Jan. 22, 2019, the disclosure of which is incorporated herein by reference.

FIELD

The present disclosure relates to electrical energy generating systems, apparatuses, and methods, and specifically related to systems capable of floating, or being suspended, in a fluid such as water.

BACKGROUND

Energy in moving water, such as in ocean tides and currents, streams, and rivers, is present both at the surface of the water and below the surface. Over the course of human history, the energy in moving water has been harnessed by a variety of systems, such as wheels with blade arrays, against which the water impacts or is held causing the systems to rotate. More specifically, the systems have been categorized as rotating in a vertical plane with horizontal axis and rotating in a horizontal plane with vertical axis having enclosed turbines.

Much development has been done with these systems to focus the flow of water onto the blades using dam-impounded water from races, flumes, penstocks, channels, and other methods. In addition, these systems often require removable screens or trash racks to keep floating objects from fouling the system requiring manual cleaning. While the power output of the systems has increased over time, systems (e.g., dams) for focusing the flow of water to the power producing systems have prevented natural movement of aquatic species in the water, reduced aquatic species populations, reduced the quality of life of the aquatic species, reduced movement of uprooted plants providing habitat and establishment of plant colonies on new land, reduced reduction of the aquatic species' traditional commercial and recreational value as healthful food, and interrupted human navigation of the water. As such, the natural, ever-changing value of free-flowing water, and adjacent riparian zones mitigating expensive flooding and valuable deposition of nutrient sediments, has been diminished by the focus systems.

Citizen actions opposing dams add costs to already costly public works projects, and, costly removal of dams, sometimes due to citizen demands, often consume taxes to restore free flow of the water as the dams naturally fall apart due to neglect and lack of repair. In addition, the dam impoundments may be naturally filled with sediment, often stranding workable power generating equipment therein.

Surface portions of lakes and oceans have localized and steady wind-driven currents and/or waves and subsurface currents from which power is rarely harvested due to impacts of rigid drive blades on water fauna, mooring on water body bottom and due to debris in water damaging or jamming blades and equipment, which require costly reinforced gear equipment necessary to withstand constant water-borne impacts. Prior art conventional systems for application on the surface and subsurface of water include tow bobbers without power generating, "squirrel-cage" barges or two-ended axis tethered systems, propellers, micro-peltons, articulating buoys, thermal layer exploitation, vertical bobber effects, marine propeller with or without concentrator, and conventional systems developed by manufacturers such as Aquamarine Power, AW Energy, Pelamis Wave Power, Seatricity, Scottish Power Renewables, Wello Oy, Alstrom, Hammerfest, Kawasaki Heavy Industries, Megallonas, Nautricity, Voith, etc.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a power generating system for generating electrical energy from a flow of a fluid includes an energy generating assembly having an outer shell defining an interior space and a center axis, a fixed generator coil stator extending in the interior space along the center axis, and a rotor encircling the stator and having magnets. The rotor is coupled to the outer shell, and the outer shell is configured to be rotated by the flow of the fluid such that the rotor rotates relative to the stator and thereby generates electrical energy.

In certain examples, a method for generating energy from a flow of a fluid includes positioning an energy generating assembly in the flow of the fluid such that the flow of the fluid along the energy generating assembly causes the energy generating assembly to generate energy. The energy generating assembly comprises an outer shell defining an interior space and a center axis, a fixed generator coil stator extending in the interior space along the center axis, and rotor encircling the stator and having magnets. The method includes coupling the rotor to the outer shell such that the rotor rotates with the outer shell, and permitting rotation of the outer shell by the flow of the fluid such that the rotor rotates relative to the stator and thereby generates electrical energy.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

FIG. 8 is a side view of another example electrical energy generating system of the present disclosure.

FIG. 9 is a cross sectional view of the electrical energy generating system of FIG. 8. The system includes an electrical energy generating assembly, and a rotor is removed from the electrical energy generating assembly depicted in FIG. 9 to expose a stator coil and elongated keys that axially inwardly extend from an interior surface of an outer shell. The cross sectional view of the outer shell near a nose section of the assembly is flared out to depict the evenly spaced elongated keys in greater detail.

FIG. 10 is a perspective view of an example rotor of the present disclosure.

FIG. 11 is a perspective view of a tail section of the electrical energy generating assembly of FIG. 9.

FIG. 12 is a perspective view of another example electrical energy generating system of the present disclosure.

FIG. 13 is an exploded view of the system depicted in FIG. 12.

DETAILED DISCLOSURE

Figure 1:
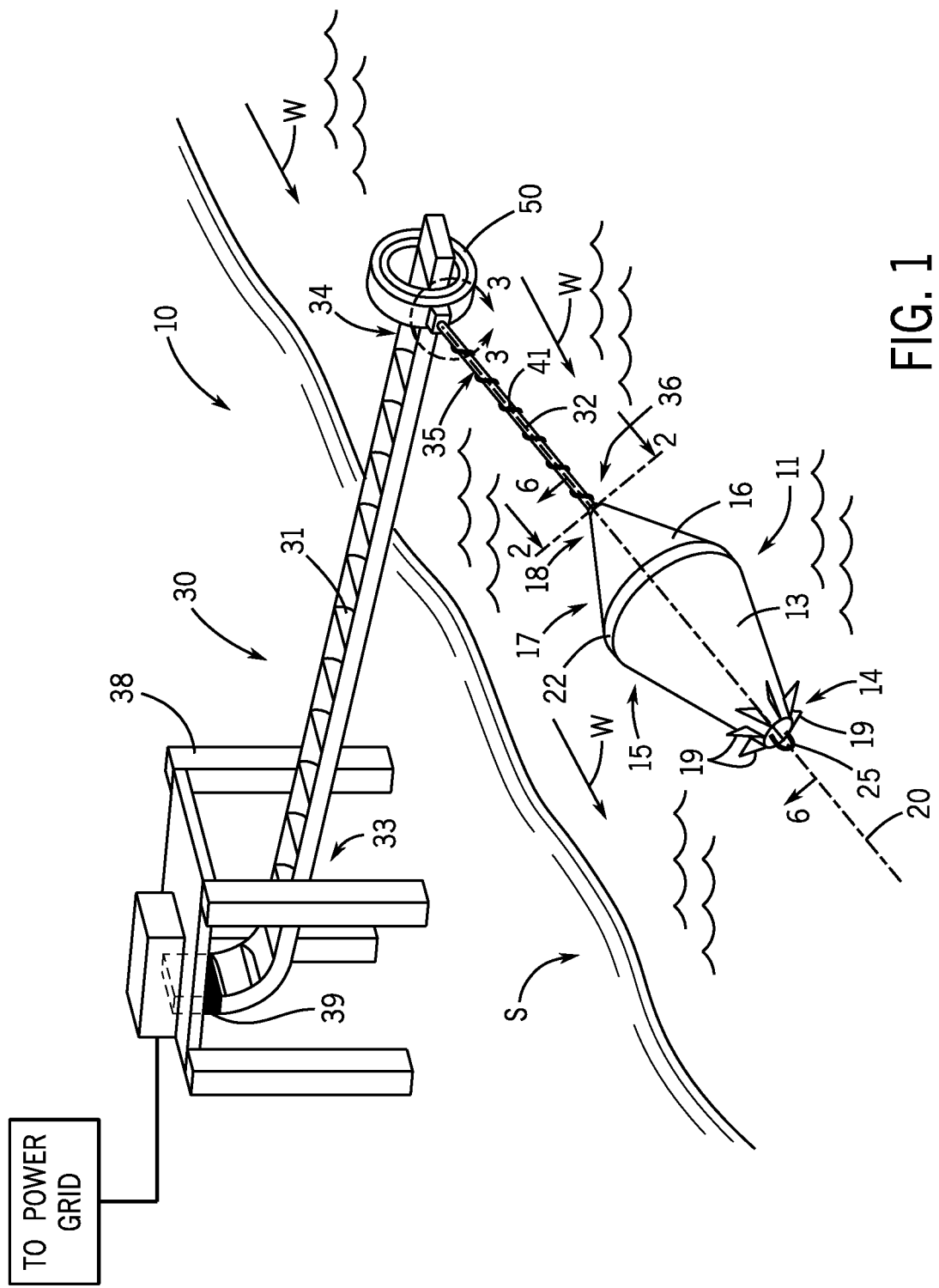
FIG. 1 is a perspective view of an example electrical energy generating system of the present disclosure.
Figure 2:
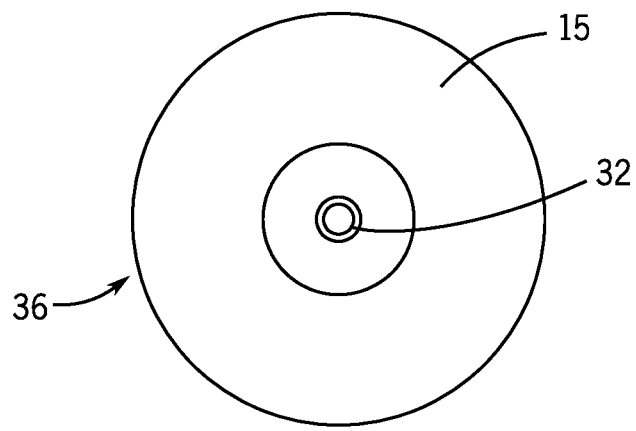
FIG. 2 is an end view of an energy generating assembly at line 2-2 on FIG. 1.
Figure 3:
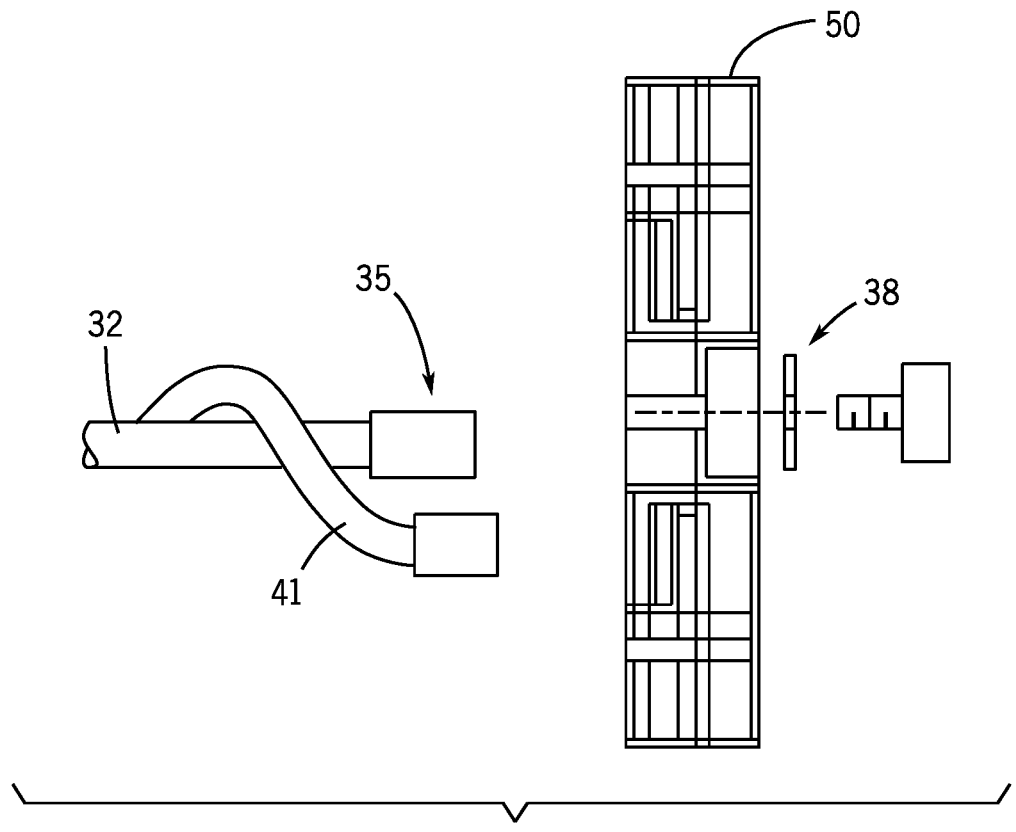
FIG. 3 is an enlarged partial side view of an electrical energy generator within line 3-3 on FIG. 1

The apparatuses and the systems described herein below may require no additional systems for fixed concentration of water flow, allow for movement of aquatic users, allow for mass installation of the systems with minimal shoreline disturbance to better approach displaced dam-based power systems through wide-spread installations, allow for extension from shore of systems into stronger flows away from shore, and/or allow for retraction to shore for system servicing and snagged tree or debris removal. The present disclosure also includes methods of shedding potential snags, methods for floating of system enclosure keeping generating equipment above water in event of dislodging of the system from a shore mount, methods for harvesting of energy from natural bobbing of the system due to water movement, and/or methods for mounting other free-fuel energy collection devices, like wind-power generators and photovoltaics. Additional exemplary configurations allow adaptation for use in sub-surface environments, such as by using a tubular, or torpedo, shaped rotating part.

Referring to FIGS. 1-7, an example energy generating system 10 of the present disclosure is depicted. The system 10 includes an energy generating assembly 11 that floats in flowing surface water 8, such as a stream or river (see arrows W which indicate flow of the water from an upstream direction to a downstream direction). The assembly 11 is connected to the shore S via a frame 30. The frame 30 has a structure 38 or member anchored in the shore S and a first arm 31 extending over the water W. Specifically, the first arm 31 has a first end 33 coupled to the anchored structure 38 and an opposite second end 34 that extends from the shore S. In certain examples, the first arm 31 is retractable and/or may telescope. The second end 34 is connected to an electrical energy generator 50, such as a two-axis gimbal having interacting rotating parts. Furthermore, a second arm 32 is connected to the electrical energy generator 50, and the second arm 32 extends in the downstream direction. Specifically, the second arm 32 has a first end 35 coupled to the electrical energy generator 50 and an opposite second end 36 coupled to the assembly 11 (note that the second end 36 is also referred to as a connector end 36 herein below). In certain embodiments, the frame 30 is modified for attachment to existing anchoring structures, such as bridges and spillways. In certain embodiments, the first arm 31 is pivotally coupled to the anchored structure 38 such that the assembly 11 can be moved in the water W (see pivoting connection 39 on FIG. 1). The frame 30 and/or the assembly 11 can also be utilized as navigation markers.

The assembly 11 has an outer shell comprising a rotating first shell 13 coupled to a rotating second shell 16 which are both made of materials that are flexibly and resiliently firm such as reinforced ultra high-molecular weight high-density polyethelene (UHMWPE) that are blown- or rotation-molded, similar to plastic barrels or marine fenders. The first shell 13 has integrally formed or mechanically attached drive vanes 19 that respond to the flow of the water W along the drive vanes 19 by rotating the shells 13, 16. The drive vanes 19 are preferably formed from the same materials as the shells 13, 16 such that the drive vanes 19 are flexible and resiliently firm. In this way, the drive vanes 19 comprise an internally elastic or spring characteristics that enhance rotational forces produced by the drive vanes 19, prevent damage to marine life (e.g., the drive vanes 19 are superficially soft), and increase buoyancy of the assembly 11. Note that in other examples, the drive vanes 19 are formed from other materials such as different plastics or rubber. In certain examples, the assembly 11 vertically rises in the water W and/or partially out of the water W (see FIG. 7) in a manner similar to a motor boat with a bow that rises up at a predetermined operating speed to reduce drag while the heavy motor causes the propeller to stay below the water surface. In certain examples, the drive vanes 19 are replaceable. In these examples, the drive vanes 19 are removably coupled to the first shell 13 with interior shell attachments (not shown) such as molded inserts that are positioned at the tail in, and are accessible from, the interior space defined by the first shell 13. For the sub-surface application, the first shell 13 may be referred to as the "tail", the second shell 16 may be referred to as the "body", and the coupling device 23 and attached components may be referred to as the "nose" of the assembly 11.

In certain examples, the assembly 11 is similar to a large rotation molds which have solid polymer injected first as an impact resistant cover, a closed-cell buoyant inner foam layer, and an interior surface impact-resistant layer, seen in plastic (UHMWPE) barrels or marine fenders. In certain examples, the shells 13, 16 have a double wall (e.g., an exterior wall and an inner wall) with buoyant foam 24 between the interior wall and the exterior wall (see FIG. 6). In other examples, the shell 13, 16 have a single wall and a layer of buoyant foam 24 along the interior surface of the shells 13, 16. In certain examples, an electrical energy and structural coupling device 23 (described herein below) is located within the nose portion of the assembly 11 and attached to the second shell 16. Note that first shell 13 and second shell 16, that is the tail, body, and nose, rotate together as a single unit.

The shells 13, 16 are each generally conically shaped (e.g., the shells 13, 16 are shaped like an asymmetrical nun buoy without central cylindrical section) for surface floating applications. The first shell 13 (tail) has a downstream first end 14 and an opposite upstream second end 15. The diameter D2 of the second end 15 is larger than the diameter D1 of the first end 14. The first end 14 is weighted and sized such that in the event that the assembly 11 disconnects from the frame 30 and floats away, the electrical energy generating components (described herein below) inside the assembly 11 are kept above the surface of the water W. A retrieval member 25 is coupled to the first end 14 of the first shell 13 such that the assembly 11 may be lassoed or hooked by an operator with a retrieval tool (e.g., a handheld elongated hook) to pull the assembly 11 out of the water W.

The second shell 16 has a downstream first end 17 and an opposite upstream second end 18. The diameter D3 of the first end 17 is larger than the diameter D4 of the second end 18 and allows the two shells 13, 16 to lock together. The first end 17 of the second shell 16 is orientated toward to the second end 15 the second shell 16. The second end 18 of the second shell 16 is coupled to the second arm 32 via a coupling device 23. The coupling device 23 is preferably stationary and provides a base for a stator around which a permanent magnet rotor rotates (described herein). The coupling device 23 may be crimped on the connector end 36 and may be similar to a ferrule and/or machined to accommodate bearing an attached rotor mount frame, armor cap, and/or instrumentation platform.

Figure 5:
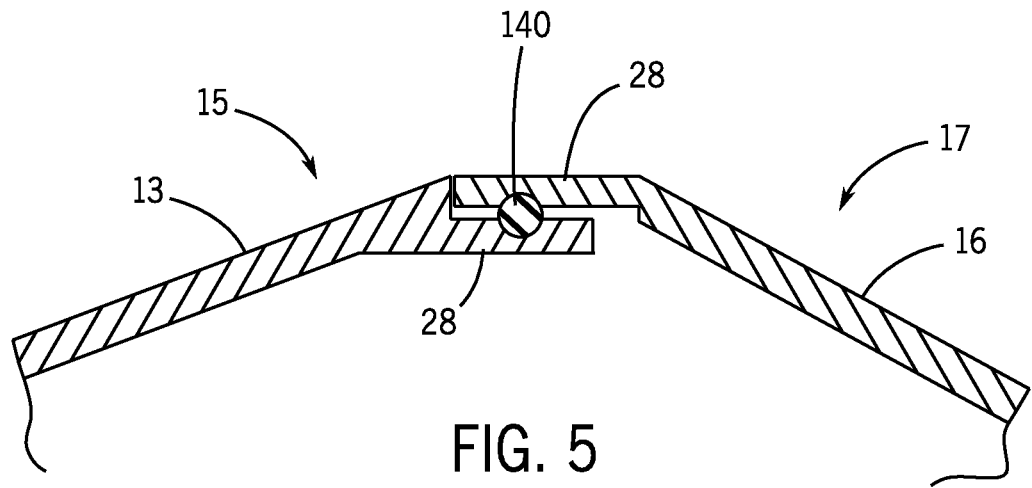
FIG. 5 is a partial cross sectional view of a first shell and a second shell within line 5-5 on FIG. 6.

The first shell 13 has an annular member 28 extending from the second end 15 that underlaps and engages an annular member 28 extending from the first end 17 of the second shell 16 to thereby form a collar 22 (see FIG. 5). The underlapping/overlapping annular members 28 of the shells 13, 16 advantageously prevents water infiltration into the interior space of the assembly 11, enhance laminar fluid flow around the assembly 11, and/or shed snags that may contact the assembly 11. The water tight seal between the shells 13, 16 at collar 22 may be accomplished by those familiar with the technology using locking circular rotary seals, such as those manufactured by Parker-Hannifin Corporation EPS Division in sewer pipe applications, and internal mechanical fastenings between the connector end 36 and internal structure of the assembly 11 components. In certain examples, a compressible, O-ring or gasket is positioned between the annular members 28 to thereby form a water tight seal there between.

Figure 4:
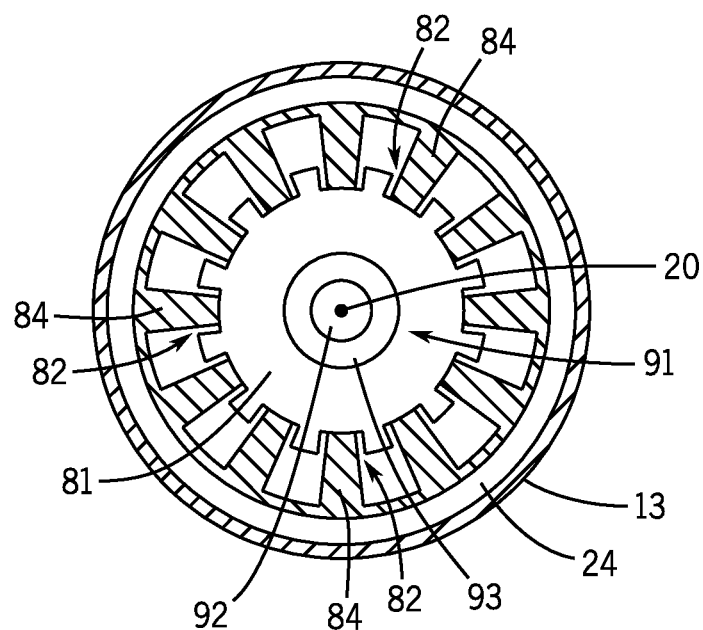
FIG. 4 is a cross sectional view of the energy generating assembly at line 4-4 on FIG. 6.
Figure 6:
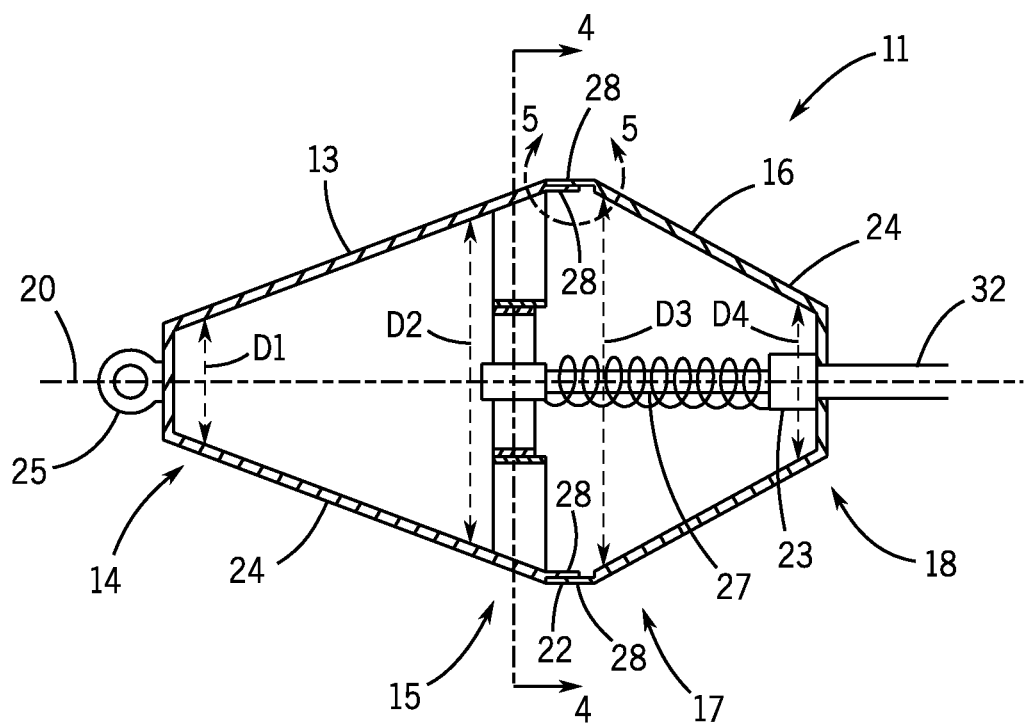
FIG. 6 is a cross sectional view of the energy generating assembly along line 6-6 on FIG. 1.
Figure 7:
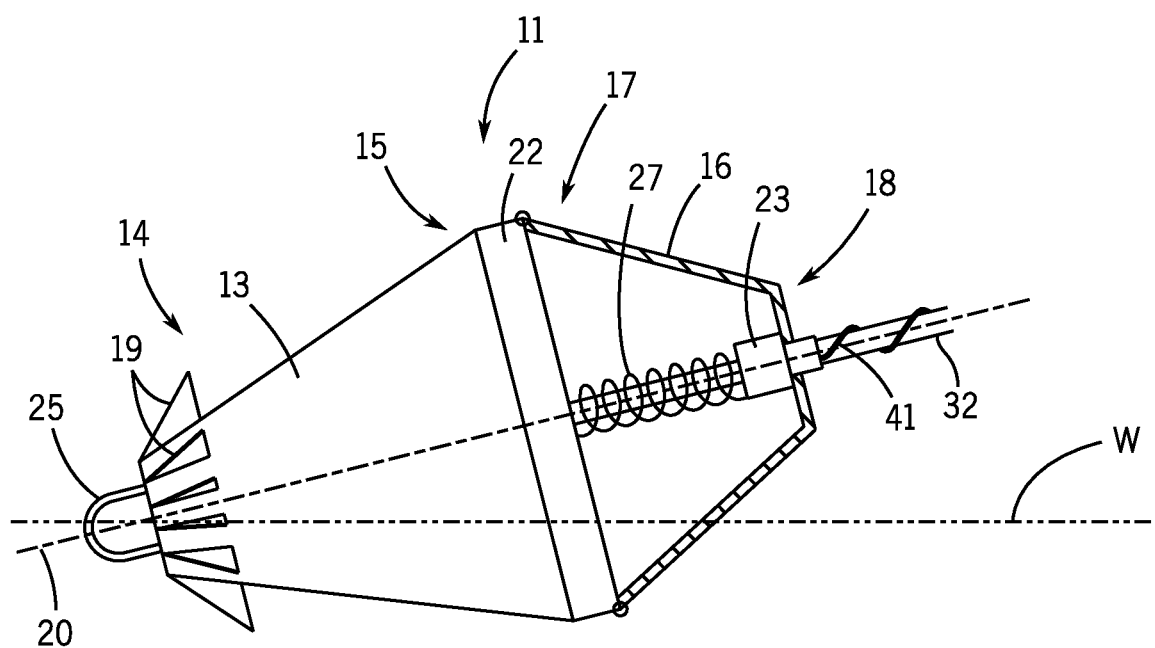
FIG. 7 is a side view of the energy generating assembly of FIG. 1 with the second shell removed to expose interior components of the energy generating assembly.

Referring now to FIGS. 4 and 6, the interior space within the assembly 11 houses various electrical energy generating components. For example, a stator 91 has a stationary stator core 92 extends along the center axis 20 and one or more stator coils 93 are wrapped around the stator core 92. In certain examples, the stator 91 is a fixed generator coil stator. The stator 91 is electrically coupled to a stationary coupling device 23 (FIG. 6) that does not rotate with the shells 13, 16. A rotor 81 having one or more permanent magnets is driven by the first shell 13. Note that the rotor 81 in this example includes a plurality of channels 82 that radially inwardly extend toward the center axis 20. The first shell 13 includes a plurality of radially inwardly extending keys 84 that extend into the channels 82 of the rotor 81 such that as the first shell 13 rotates, the rotor 81 is rotated about and relative the stator 91. Thus, the assembly 11 generates electrical energy as the first shell 13 is rotated by the water W, as described above. In certain examples, the shells 13, 16 are affixed to the rotor 81 via an integrally formed or separate frame that extends between the outer shell (e.g., the first shell 13) and the rotor 81. Note that in certain examples, the assembly 11 can rotate with the frame 30 via the coupling device 23 such that the entire assembly 11 rotates about the center axis 20 to minimize the resistance of water flowing perpendicular to the plane of rotation of the assembly 11.

Each energy generating component, such as the stator 91 with stator coils 93 and connections excitable by permanent magnets in rotor 81, may require specific geometric relationships for efficient energy generating performance. In one example, modifying mass-produced generating components can be attached to the frame 30 or fit into a tube to thereby allow ganged application of several energy generating components with suitable coupling there between. For example, linking multiple stators may require some shock absorbing components when attached to stationary coupling device 23. In other examples, the rotating components may have modifications in the housings of the rotating components that allow for direct and secure connection to the shells 13, 16 of assembly 11 that are rotated by flowing water W. Furthermore, in some examples, inside surface of assembly 11 having frame drive ribs or keys that facilitate insertion of ganged energy generating component sets into the interior space within the assembly 11, or, a custom sized generator set.

Referring to FIG. 6, the coupling device 23 is formed as a unitary piece, such as a forging with machined fittings, or as a tight-fitting assembly, or some combination, such that it may accept through an orifice, or parts forming an orifice, the connector end 36 of the second arm 32, whether solid or hollow, to form a strong connection with a ferrule or clamp system. The coupling device 23 has an upstream surface capable of serving as a seat for anti-friction bearing for rotating parts, to which is affixed: the rotating (nose) part of the connector end 36 to which the rotating second shell 16 (body part) into which a first shell 13 (tail part) is lockably affixed and sealed, an armored section upstream along connector end 36, a loosely-fit shock absorbing armor cap to protect assembly 11 from impacts from objects in water, an internal electrical connector routing system, and/or an attachment for instrument, sensing, communications, guidance, and/or ballast control systems, etc., without limit.

The coupling device 23 can include a stator mount or link (not shown), rotating part bearing, armor cap, and shell attachment. The electrical energy generator 50, which may include two-axis gimbal set components, at the end 34 of first arm 31 and the end 35 of the second arm 32 is powered by bobbing of the assembly 11 in the water W, and the electrical energy generator 50 can be affixed to the end of a structural chain of limited motion links capable of shielding connectors to the shore S (similar to cable "schlepp" or similar products made by IGUS, and others etc.). In certain embodiments, electrical energy may also be harvested from a closed circuit fluid pumped by rotation of the assembly 11 traveling through tubes in voids in the center of the second arm 32, the secondary energy generator 50, and/or the first arm 31 to the anchored structure 38, where the fluid may turn electrical energy generating equipment, as is done with some conventional marine electrical energy harvest systems.

A "no-twist" woven non-conducting attachment cable 27, such as those made by Elliot Manufacturing, is used as stationary supports with slight impact absorbing flexibility, or other methods without limit, affixes the coupling device 23 to the stator generator part and is used to form the connector 32 (e.g., arm) having the connector end 36 to which the other end of the coupling device. The attachment cable 27 has a crimped- or ferrule-type fitting at each end that serve as mounts or connection locations at the assembly 11 and at the secondary energy generator 50. Electrical energy generated by the energy generating components within the assembly 11 is transferred to shore S via an electrically conductive components. Specifically, the electrical energy flows from stator coils to a bus bar on stator through to electrical connection 41 on the coupling device 23 and to shore via transmission cable along or within the second arm 32 through an energy-generating electrical energy generator 50 powered by bobbing of the assembly 11, and through or on the first arm 31 to the anchored structure 38 and a power storage device or power grid.

Referring back to FIG. 1, the secondary energy generator 50 can be any suitable device capable of generating electrical energy as the secondary energy generator 50 "bobs" from the water 8. In one example, the secondary energy generator 50 includes an energy producing two-axis gimbal that is connected to the first arm 31 and the second arm 32 and is configured to generate electrical energy as the assembly 11

"bobs" in the water 8. In this example, the two-axis gimbal has rotating parts with micro-arc rotations as movement from parts connected to the two-axis gimbal "bob" from the moving water W which may be used to generate electrical energy. Two-axis gimbals are well-known in the art to those familiar with mounting optical components, such as mirrors, lasers, etc, and some examples are manufactured by companies such as General Dynamics, Aerotech, Newmark Systems, etc.

In certain embodiments, a fluid concentrating structure (not shown) with flappy vanes (not shown) similar to whale flukes is connected to the attachment cable 27 near the connector end 36 such that the flappy vanes which shed snags penetrate the water and thereby increase the flow of the water at the drive vanes 19 on the assembly 11. In certain other embodiments, an additional concentrating configuration has, without limitation, a fixed housing shell with concentrating vanes, affixed to the second shell, attached rotor frame and rotor, rotating at the collar 22.

Referring now to FIGS. 8-11, another embodiment of the assembly 11 is depicted for sub-surface applications. The submerged and/or water-suspended assembly 11 can have a tubular shape with uniform sections and tail with rotational drive vanes 19. In this embodiment, the assembly 11 has a shape that is similar to a torpedo into which a generating rotor 81 is coupled to the inner surface of the outer shell 120 walls for heat dissipation around a stator 91. FIG. 10 depicts the rotor 81 and the stator 91 in greater detail. The rotor 81 includes a plurality of channels 82 that are configured to receive elongated keys 84 (FIG. 9) that axially inwardly extend from the interior surface of the outer shell 83. The keys 84 are received into the channels 82 such that the rotor 81 rotates with the outer shell 83. Referring back to FIG. 8, the assembly 11 has a nose 87 having an armor shroud or cap 88 with guidance systems (not shown) coupled around the center fixed arm (such as the second arm 32 of the frame 30 depicted in FIG. 1) or tether 89 at the reinforced or armored shroud or cap 88. The cap 88 can be configured to generate cavitation bubbles to reduce drag between the water W and rotating assembly 11, with depth further determined by internal buoyancy controls and tethering cable, all rotating and drive components clad in soft barrel type materials to reduce injury to marine life and to reduce impact damage to assembly 11. The assembly 11 in this example is coupled to the ground or shore with the tether 89 that permits the assembly 11 to move as the flow of the water W changes. That is, as the direction of the flow of the water W changes the tether 89 permits the assembly 11 to move with the flow of the water and orientate itself for maximum electrical energy generation. For example, the assembly 11 extends and is orientated toward the shore S when the flow of the water W is in a direction toward the shore S (e.g., waves of the water W move toward the shore S) and the assembly extends and is orientated away from the shore S when the flow of the water is in a direction away from the shore S (e.g., waves of the water W recede away from the shore S).

Referring now to FIGS. 12-13 another example of the system 10 is depicted. The 10 system includes an assembly 11 that has a hollow outer shell 120 with a plurality of drive vanes 19 on the first shell 13 near the tail or downstream end of the outer shell 120. A rotary seal cap 88 is coupled to the second shell 16 near the nose or opposite upstream end of the outer shell 120. The cap 88 has a center hole through which a stationary connector end 36 of an arm (see the second arm 32 depicted in FIG. 1) or a tether is inserted, followed by a bearing 122 attached to an inner portion of the cap 88. A stationary coupling device 23 is attached to the connector end 36 using ferrule-type device 124 and having attachment for a stator 91 with a linear gear surface allowing the stator coils 93 to be located along the stator core 92 (FIG. 4) and served by controls affixed to coupling device 23 communicating with devices or managers capable of moving the assembly 11 to thereby trim the assembly 11 as necessary. Note that the keys 84 on the inside of the outer shell 120 linearly extend parallel to the center axis 20 and are received into the channels 82 of the rotor 81 such that the rotor 81 rotates with the outer shell 120 and about the stator 91.

In certain examples, an energy generating system for generating electrical energy from flow of a fluid includes an energy generating assembly having an outer shell defining an interior space and a center axis, a fixed generator coil stator extending in the interior space along the center axis, and a rotor encircling the stator and having magnets. The rotor is coupled to the outer shell, and the outer shell is configured to be rotated by the flow of the fluid such that the rotor rotates relative to the stator and thereby generates electrical energy. The outer shell can include a plurality of drive vanes extending from the outer shell and the drive vanes can be configured to rotate the outer shell as the flow of the fluid flows along the drive vanes. In certain examples, the drive vanes are removably coupled to the outer shell. In certain examples, the outer shell has a conically shaped first shell with a first end having a first diameter and an opposite second end having a second diameter that is larger than the first diameter and a conically shaped second shell with a first end having a first diameter and an opposite second end having a second diameter that is smaller than the first diameter. The second end of the first shell is orientated toward the first end of the second shell. In certain examples, the first shell has a first annular member extending from the second end of the first shell and the second shell has a second annular member extending from the first end of the second shell. The second annular member overlaps the first annular member to thereby define an annular collar. In certain examples, the first annular member and the second annular member engage each other such that a water-tight seal is formed between the first shell and the second shell. In certain examples, an O-ring 140 received between the first annular member and the second annular member such that a water-tight seal is formed between the first shell and the second shell.

In certain examples, the energy generating assembly has a coupling device that is stationary relative to the rotating outer shell and permits flow of the generated electrical energy away from the assembly. In certain examples, the energy generating assembly has a non-twist attachment cable coupled between the stator and the coupling device. In certain examples, an anchored structure and a frame extending from the anchored structure anchor the energy generating assembly to the ground. In certain examples, the frame has a first arm that extends from the anchored structure and a second arm that extends transverse to the first arm in a direction parallel to the flow of the fluid. In certain examples, a conductive cable is coupled to the energy generating assembly and extends along the first arm and the second arm such that the electrical energy generated by the energy generating assembly can be transferred from the energy generating system. In certain examples, the flow of the fluid is from upstream to downstream and the first arm extends transverse to the flow of the fluid, and wherein the second arm extends in a direction from upstream to downstream relative to the first arm. In certain examples, the first arm is pivotally coupled to the anchored structure such that the frame and the assembly can pivot relative the anchored structure. In certain examples, the first arm has a first end coupled to the anchored structure and an opposite second end coupled to a secondary energy generator that is configured to vertically move in the flow of the fluid and thereby generate electrical energy. The second arm has a first end coupled to the secondary energy generator and an opposite second end coupled to the energy generating assembly.

In certain examples, the energy generating assembly is configured to be submerged in the flow of the fluid. In certain examples, the outer shell is tubular and has a cap that protects the assembly from debris in the flow of the fluid. A tether can be provided to thereby couple the assembly to the ground. In certain examples, the system can include extending systems for positioning the assembly nearer or farther from shore in desired fluid flows.

In certain examples, a method for generating energy from a flow of a fluid includes positioning an energy generating assembly in the flow of the fluid such that the flow of the fluid along the energy generating assembly causes the energy generating assembly to generate energy. The energy generating assembly comprising an outer shell defining an interior space and a center axis, a stator extending in the interior space along the center axis, and a rotor encircling the stator and having magnets. The method includes coupling the rotor to the outer shell such that the rotor rotates with the outer shell, and permitting rotation of the outer shell by the flow of the fluid such that the rotor rotates relative to the stator and generates electrical energy. The method can also include anchoring the energy generating assembly to a ground with an anchored structure and a frame, wherein the anchored structure is anchored to the ground and the frame extends from the anchored structure to the assembly.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An energy generating system for generating electrical energy from a flow of a fluid, the system comprising:
   an energy generating assembly having:
      an outer shell defining an interior space and a center axis, the outer shell has a plurality of drive vanes formed of a flexible material that reduce injury to marine life in the fluid that contact the drive vanes;
      a fixed generator coil stator extending in the interior space along the center axis; and
      a rotor encircling the stator and having magnets, the rotor is coupled to the outer shell;
   wherein the plurality of drive vanes are configured to cause rotation of the outer shell as the fluid flows along the outer shell such that the rotor rotates relative to the stator and thereby generates electrical energy.

2. The energy generating system of claim 1, further comprising a frame that couples the energy generating assembly to an anchored structure, and wherein the frame has a first arm pivotally coupled to the anchored structure such that the frame and the energy generating assembly are pivotable relative to the anchored structure.

3. The energy generating system of claim 1, wherein the drive vanes are removably coupled to the outer shell.

4. The energy generating system of claim 1, wherein the outer shell has:
   a conically shaped first shell with a first end having a first diameter and an opposite second end having a second diameter that is larger than the first diameter, and
   a conically shaped second shell with a first end having a first diameter and an opposite second end having a second diameter that is smaller than the first diameter;
   wherein the second end of the first shell is orientated toward the first end of the second shell.

5. An energy generating system for generating electrical energy from a flow of a fluid, the system comprising:
   an energy generating assembly having:
      an outer shell defining an interior space and a center axis;
      a fixed generator coil stator extending in the interior space along the center axis; and
      a rotor encircling the stator and having magnets, the rotor is coupled to the outer shell;
   wherein the outer shell is configured to be rotated by the flow of the fluid such that the rotor rotates relative to the stator and thereby generates electrical energy:
   wherein the outer shell has:
      a conically shaped first shell with a first end having a first diameter and an opposite second end having a second diameter that is larger than the first diameter; and
      a conically shaped second shell with a first end having a first diameter and an opposite second end having a second diameter that is smaller than the first diameter;
   wherein the second end of the first shell is orientated toward the first end of the second shell;
   wherein the first shell has a first annular member extending from the second end of the first shell and the second shell has a second annular member extending from the first end of the second shell; and
   wherein the second annular member overlaps the first annular member to thereby define a collar.

6. The energy generating system of claim 5, wherein the first annular member and the second annular member engage each other such that a water-tight seal is formed between the first shell and the second shell.

7. The energy generating system of claim 5, further comprising an O-ring received between the first annular member and the second annular member.

8. The energy generating system of claim 1, wherein the energy generating assembly has a coupling device that is stationary relative to the rotating outer shell and permits flow of the generated electrical energy away from the assembly.

9. An energy generating system for generating electrical energy from a flow of a fluid, the system comprising:
   an energy generating assembly having:
      an outer shell defining an interior space and a center axis;

a fixed generator coil stator extending in the interior space along the center axis; and a rotor encircling the stator and having magnets, the rotor is coupled to the outer shell;

wherein the outer shell is configured to be rotated by the flow of the fluid such that the rotor rotates relative to the stator and thereby generates electrical energy;

wherein the energy generating assembly has a coupling device that is stationary relative to the rotating outer shell and permits flow of the generated electrical energy away from the assembly; and wherein the energy generating assembly has a non-twist attachment cable coupled between the stator and the coupling device.

10. The energy generating system of claim 1, further comprising an anchored structure and a frame extending from the anchored structure to the energy generating assembly.

11. The energy generating system of claim 10, wherein the frame has a first arm that extends from the anchored structure and a second arm that extends transverse to the first arm and in a direction parallel to the flow of the fluid.

12. The energy generating system of claim 11, further comprising a conductive cable that is coupled to the energy generating assembly and extends along the first arm and the second arm such that the electrical energy generated by the energy generating assembly can be transferred away from the energy generating assembly.

13. The energy generating system of claim 11, wherein the flow of the fluid is from upstream to downstream and the first arm extends transverse to the flow of the fluid, and wherein the second arm extends in a direction from upstream to downstream relative to the first arm.

14. An energy generating system for generating electrical energy from a flow of a fluid, the system comprising:

an energy generating assembly having:
an outer shell defining an interior space and a center axis;
a fixed generator coil stator extending in the interior space along the center axis;
a rotor encircling the stator and having magnets, the rotor is coupled to the outer shell; and
an anchored structure and a frame extending from the anchored structure to the energy generating assembly;
wherein the outer shell is configured to be rotated by the flow of the fluid such that the rotor rotates relative to the stator and thereby generates electrical energy,
wherein the frame has a first arm that extends from the anchored structure and a second arm that extends transverse to the first arm and in a direction parallel to the flow of the fluid; and wherein the first arm is pivotally coupled to the anchored structure such that the frame and the energy generating assembly can pivot relative the anchored structure.

15. The energy generating system of claim 11, wherein the first arm has a first end coupled to the anchored structure and an opposite second end coupled to a secondary energy generator that is configured to vertically move in the flow of the fluid and thereby generate electrical energy; and wherein the second arm has a first end coupled to the secondary energy generator and an opposite second end coupled to the energy generating assembly.

16. The energy generating system of claim 1, wherein the energy generating assembly is configured to be completely submerged in the flow of the fluid.

17. The energy generating system of claim 16, wherein the outer shell has a tubular shape and a cap that protects the energy generating assembly from debris in the flow of the fluid.

18. The energy generating system of claim 17, further comprising a tether that couples the energy generating assembly to ground.

* * * * *